United States Patent
Nakada

[11] Patent Number: 5,839,351
[45] Date of Patent: Nov. 24, 1998

[54] PISTON

[75] Inventor: Teruo Nakada, Kanagawa, Japan

[73] Assignee: Isuzu Motors Limited, Tokyo, Japan

[21] Appl. No.: 776,584
[22] PCT Filed: May 15, 1996
[86] PCT No.: PCT/JP96/01278
  § 371 Date: Feb. 3, 1997
  § 102(e) Date: Feb. 3, 1997
[87] PCT Pub. No.: WO97/02418
  PCT Pub. Date: Jan. 23, 1997

[30] Foreign Application Priority Data

Jun. 30, 1995 [JP] Japan ................................. 7-186551

[51] Int. Cl.$^6$ ............................................. F01B 31/10
[52] U.S. Cl. .......................... 92/160; 92/236; 123/193.6
[58] Field of Search .......................... 92/208, 209, 234, 92/235, 236, 158, 160; 123/193.6

[56] References Cited

U.S. PATENT DOCUMENTS

| | | | |
|---|---|---|---|
| 2,190,207 | 2/1940 | Dillon | 92/235 X |
| 2,194,247 | 3/1940 | Russel | 92/236 X |
| 2,217,542 | 10/1940 | Flammang et al. | 92/236 X |
| 2,416,487 | 2/1947 | Leupe | 92/235 X |
| 2,464,554 | 3/1949 | Bushby | 92/236 X |
| 4,987,866 | 1/1991 | Mielke et al. | 92/235 X |

FOREIGN PATENT DOCUMENTS

| | | |
|---|---|---|
| 56-39837 | 4/1981 | Japan . |
| 530677 | 7/1981 | Japan . |
| 59-76737 | 5/1984 | Japan . |
| 363744 | 1/1991 | Japan . |
| 313446 | 2/1991 | Japan . |
| 842391 | 2/1996 | Japan . |

*Primary Examiner*—Hoang Nguyen
*Attorney, Agent, or Firm*—Browdy and Neimark

[57] ABSTRACT

In this piston, oil grooves 5 are provided in the selected parts of a surface of a skirt portion 3 which are liable to encounter the breakage of an oil film, and which are on the thrust side and anti-thrust side, and not in the parts of the surface of the skirt portion to which a load is imparted. The oil grooves 5 are formed in the positions higher than a piston pin 22 and lower than piston ring grooves 12, and cooling cavity 45 and oil grooves 5 communicate with each other by oil passages 47, the cooling cavity 45 and a lower open end 48 of a piston body 1 communicating with each other by an oil passage 46. Accordingly, even when the piston is inclined toward the anti-thrust direction, an oil is supplied to the clearances between outer members 7 and skirt portion 3, and the breakage of an oil film does not occur. Even when the piston body is inclined toward the thrust side and going to collide with the outer members 7, a satisfactory oil film is formed securely in the portion of the clearance which is around the colliding portion of the piston body, and the oil in the clearance is forced out. Thus, the colliding force of the piston against a cylinder liner is lessened by the oil, so that the slapping sounds of the piston can be greatly reduced.

10 Claims, 11 Drawing Sheets

(A) suction stroke (B) compression stroke (C) expansion stroke (D) exhaust stroke

4
PISTON

TECHNICAL FIELD

This invention relates to a piston having a piston body comprising an integral combination of a crown portion and a skirt portion, and outer members fitted around the skirt portion.

BACKGROUND ART

The noise occurring due to the driving of an internal combustion engine includes slapping sounds. The slapping sounds occur due to a collision of a skirt portion of a piston with a wall surface of a cylinder liner when the piston is moved reciprocatingly in a cylinder. In order that a piston can be moved reciprocatingly in a cylinder, clearances are formed between the piston and a wall surface of a cylinder liner, and in order to prevent a blow down from a combustion chamber, piston rings are fitted in piston ring grooves formed in the piston. Therefore, when the piston is moved reciprocatingly in the cylinder, the piston collides with the portion of the inner surface of the cylinder which is in a direction perpendicular to the axis of a piston pin, i.e., in a thrust direction to cause slapping sounds to occur.

Figure 7:
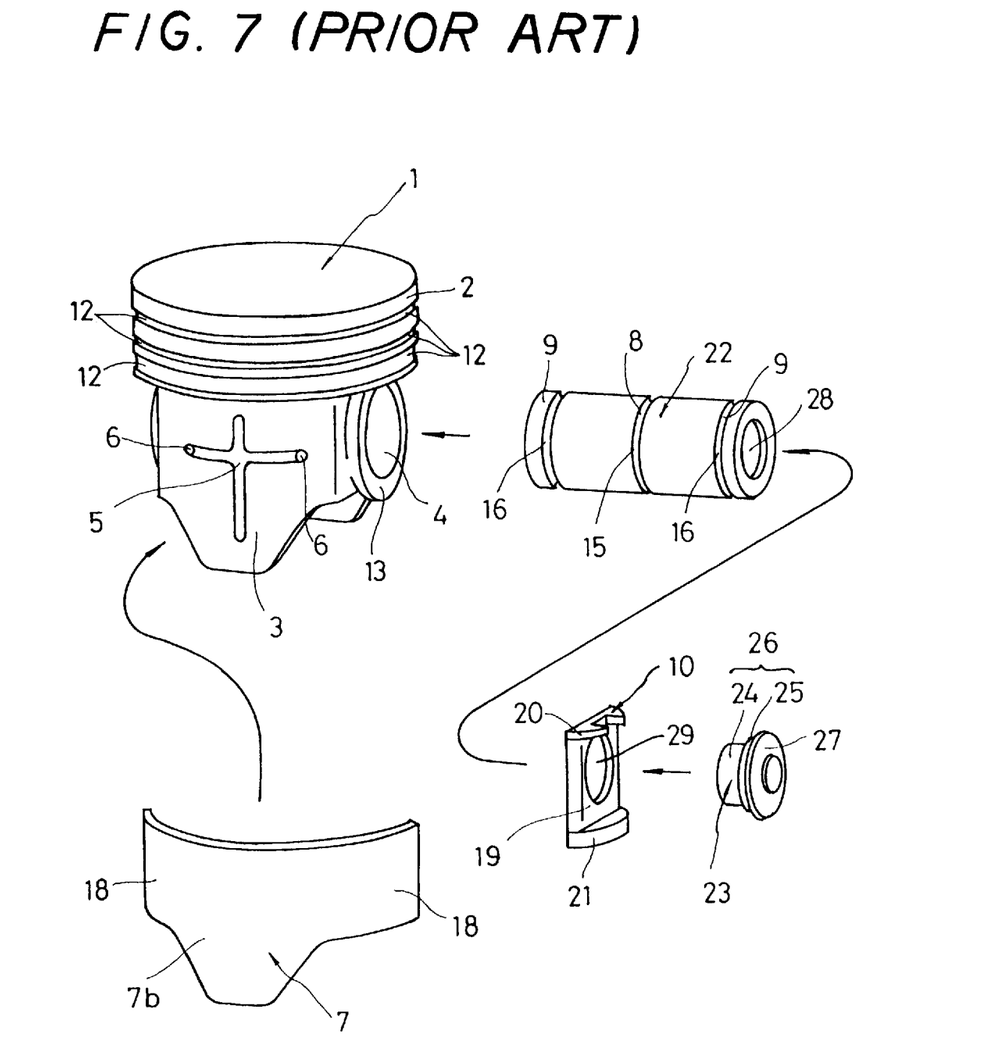
FIG. 7 is an exploded perspective view of a prior art piston.

In order to reduce such slapping sounds, various types of pistons have been developed. For example, there is a piston as a slapping sound reducing piston which is disclosed in Japanese Patent Application No. 194570/1994 filed previously by the applicant of the present invention. This piston has as shown in FIG. 7 a piston body 1 comprising a crown portion 2 provided with piston ring grooves 12, and a skirt portion 3 provided with bosses 13 in which pin bores 4, through which a piston pin 22 is inserted, are formed, outer members 7 fitted around the skirt portion 3, and outer member support members 10 interposed between the bosses 13 and outer members 7 and supporting the outer members 7 so that the outer members can be moved relatively in the thrust direction, clearances between the outer members 7 and skirt portion 3 being formed so that the clearances are wider at the intermediate portions of the outer members 7 and narrower at the peripheral portions thereof, a hydraulic pressure being supplied to this clearance.

In this piston, the outer members 7 are supported so that they can be moved relatively in the thrust direction by the outer member support members 10, and, moreover, a hydraulic pressure is supplied to the clearance between the outer members 7 and skirt portion 3. Therefore, when the piston is installed in a cylinder bore with a hydraulic pressure then supplied to the clearance, the outer members 7 are pressed against a cylinder liner and closely contact the wall surface thereof.

When this piston is moved reciprocatingly, the piston body 1 is turned, i.e., moved pivotally around the axis of a piston pin 22. In accordance with this pivotal movement, the piston body 1 is moved relatively to the outer members 7. When the piston body 1 is moved toward an outer member 7, i.e., when the piston body 1 is going to collide with an outer member 7, the pressure oil in the mentioned relative clearance is forced out from the peripheral portions thereof. Since the clearance is formed so that it is wider at the intermediate portion of the relative outer member 7 and narrower at the peripheral portions thereof, the clearance becomes smaller as the piston body 1 comes closer to the outer member 7, and the peripheral portions of the outer member display the function of restrictions. Therefore, the piston body 1 receives the resistance of the hydraulic pressure, and becomes difficult to approach the outer member 7. When the piston body 1 is thus moved around the axis of the piston pin 22, the piston body 1 receives a cushioning effect of the hydraulic pressure, and the occurrence of slapping sounds is prevented, so that the slapping sound reducing performance can be maintained for a long period of time.

Although the piston disclosed in Japanese Patent Application No. 194570/1994 is formed so that a hydraulic pressure is supplied to the clearances between the outer members 7 and skirt portion 3, the parts of the skirt portion 3 to which the hydraulic pressure should be supplied are not referred to in particular. The descriptions of the device disclosed in Japanese Utility Model Laid-Open No. 76737/1984, which device is referred to as a conventional example in the specification of the above-mentioned patent application, do not refer either to the part of a piston to which a hydraulic pressure is supplied.

Figure 9:
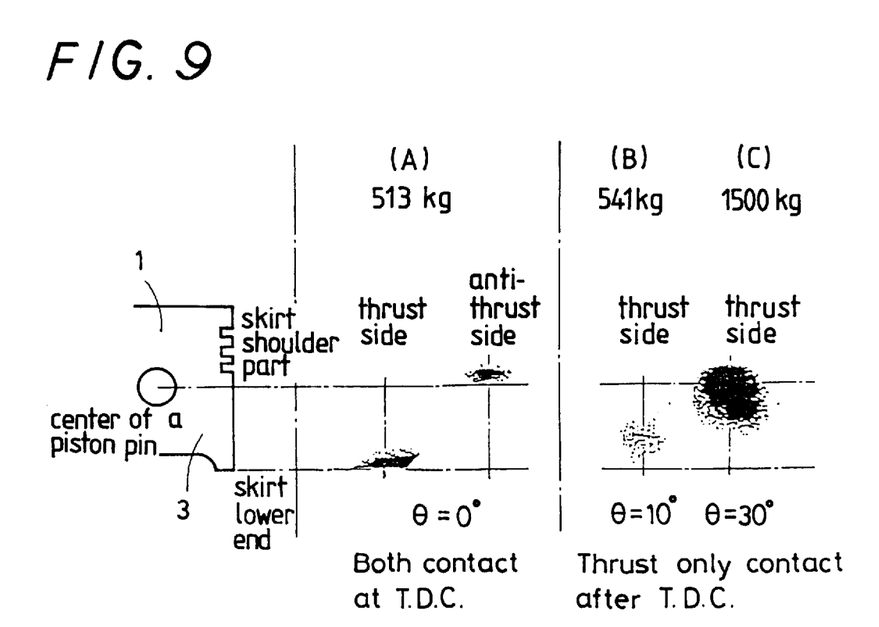
FIG. 9 is an explanatory view showing the results of the measurement using the test apparatus of FIG. 8.
Figure 10:
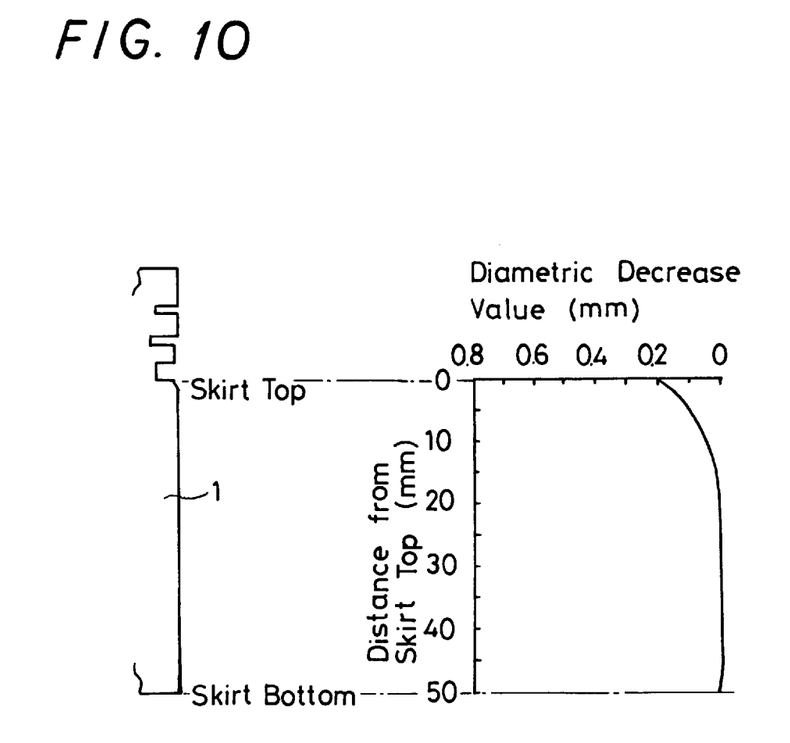
FIG. 10 is a schematic diagram showing an example of a profile of the piston.

It has been ascertained that, when a hydraulic pressure is supplied to an incorrect part of a piston, a satisfactory cushioning effect of a hydraulic pressure, the achievement of which is a final object, cannot be obtained. Namely, according to the results of the recent study of slapping sounds of a piston, the following have become clear. First, the parts of the skirt portion 3 from which a thrust load is imparted to an outer member 7 are as shown in FIG. 9 a skirt shoulder part of a height slightly larger than that of the center of a piston pin in the direction perpendicular to the axis of a piston pin, and a part in the vicinity of a skirt lower end in the same direction, i.e. these two parts in total. Secondly, since the piston is formed to a profile in which an upper portion of the piston has a smaller diameter as shown in FIG. 10, the breakage of oil film occurs on the thrust directing side when a piston body 1 is inclined toward the anti-thrust side. It has been ascertained that determining the parts to which a hydraulic pressure is to be supplied is important to obtain a slapping sound reducing effect.

Figure 8:
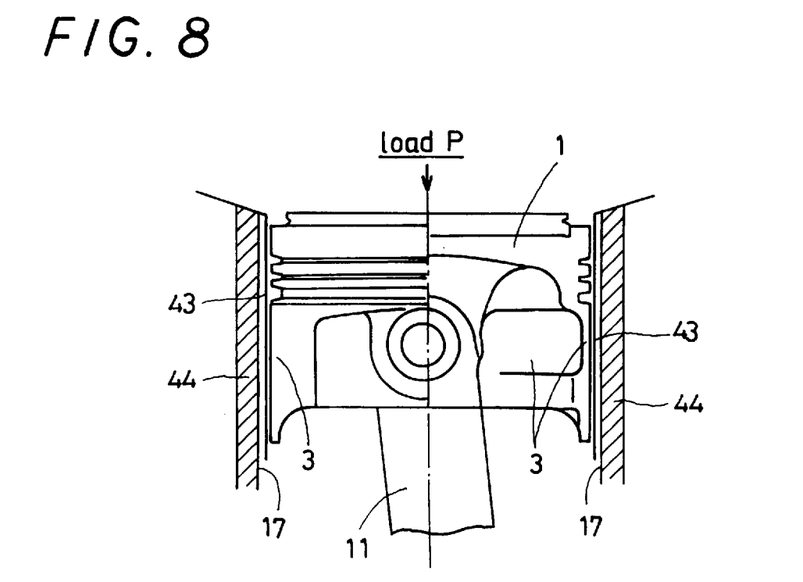
FIG. 8 is a schematic diagram showing a test apparatus for determining the portions of a piston to which a thrust load is imparted.

The parts of a piston to which a thrust load is imparted will now be described. Pressure sensitive paper 43 was held between a skirt portion 3 of a piston and a surface 17 of a cylinder liner 44 using a test apparatus shown in FIG. 8, and a connecting rod 11 was fixed at an arbitrary crank angle θ. A load P was imparted to a top surface of the piston, and a thrust load was measured with the blackened parts of the pressure sensitive paper 43 observed, to obtain the test results shown in FIG. 9. Namely, as shown in FIG. 9A, the part of the skirt portion 3 which is in the vicinity of the lower end thereof is blackened on the thrust side, and a shoulder part of the skirt portion 3 on the anti-thrust side at the top dead center(θ=0°). As shown in FIG. 9B, the part of the skirt portion 3 which is in the vicinity of the lower end thereof strikes the cylinder liner on the thrust side at a point at which the piston has been turned at 10° (θ=10°) from the top dead center toward the bottom dead center. As shown in FIG. 9C, the part of the skirt portion 3 which is between the shoulder part thereof and a middle part thereof strikes the cylinder liner on the thrust side at a point at which the piston has been turned at 30° (θ=30°) from the top dead center toward the bottom dead center. As may be understood from the results of the experiment, there are generally two parts of the skirt portion from which a thrust load is imparted from the skirt portion 3 to an outer member 7, i.e. the central region of the skirt shoulder part which is in the direction perpendicular to the axis of the piston pin, and which has a height slightly larger than that of the axis of the piston pin, and the part of the skirt portion which is in the vicinity of the lower end thereof.

In the piston disclosed in Japanese Patent Application No. 194570 mentioned above, oil grooves 5 are formed crosswise in skirt portions 3 as shown in FIG. 7, i.e., the oil grooves are formed so as to longitudinally cut the parts of the skirt portion 3 to which a load is imparted. Therefore, the load-receiving area decreases, and, moreover, a hydraulic pressure escapes from the oil grooves 5 when a load is imparted to the skirt portion. Accordingly, it can be said that forming the oil grooves 5 in the skirt shoulder part and skirt lower end part to which a load is imparted is not appropriate.

Figure 11:
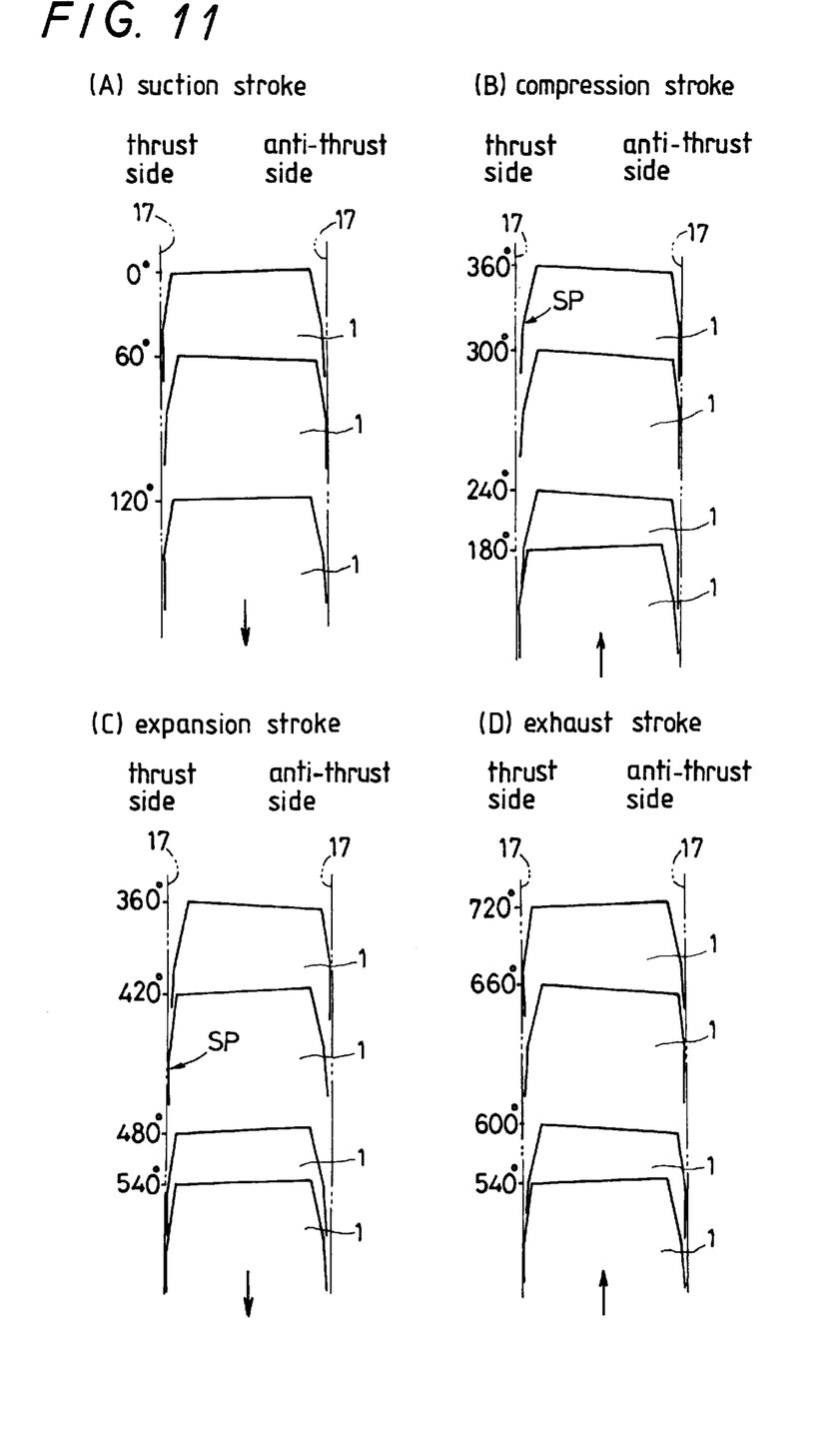
FIG. 11 is an explanatory view showing the images of the movements of the piston at regular intervals of 60 crank angles.

The problem of breakage of an oil film with respect to a piston will now be described. FIG. 11 imaginarily illustrates the movements of a piston. Referring to the drawing, the left side of the piston is the thrust side, and the right side thereof the anti-thrust side. As shown in FIG. 10, a piston is generally formed to a profile having a smaller diameter at an upper portion thereof taking the thermal expansion thereof into consideration. As shown in FIG. 11, the piston repeats pivotal movements in each of a suction stroke (A), a compression stroke (B), an expansion stroke (C) and an exhaust stroke (D). In the compression stroke, the piston moves up with a portion shown by an arrow SP and on the thrust directing side separated from a cylinder liner surface 17, so that the breakage of an oil film occurs on the portion of the arrow SP. In the expansion stroke (explosion stroke), the piston moves rapidly in a region in the vicinity of the top dead center (the range of from 360° to 420° in the drawing) toward the thrust side due to the pressure in the cylinder. When the breakage of an oil film occurs in a clearance between the portion of the arrow SP and cylinder liner surface 17, the piston collides with the cylinder liner surface 17 in a non-decelerated state to cause a slapping sound to occur.

Such phenomena also occur similarly in the piston of the type which is disclosed in the above previously filed application, and which is formed by fitting outer members 7 in a skirt portion 3. Therefore, it can be said that a hydraulic pressure should be supplied to the skirt shoulder part on which the breakage of an oil film is liable to occur.

Japanese Utility Model Laid-Open No. 39837/1981 discloses a piston for internal combustion engines. In this piston, a cooling oil in a cooling gallery is introduced into a clearance between a skirt portion of a piston body and a cylinder liner through an introduction passage, and sealed therein by seal rings provided on upper and lower parts of the skirt portion. However, the sealed oil in this piston is also deposited on the cylinder liner, so that it cannot be moved smoothly due to the viscosity thereof, the greater part of the oil being discharged from the clearance around the seal rings in the downward direction before the piston has reached the top dead center. Therefore, unless an oil is supplied from a connecting rod, or unless an oil jet capable of supplying an oil the quantity of which is larger than that of a piston cooling oil to the piston even in the top dead center is used, the effect of damping the slapping sounds of the piston cannot be improved.

SUMMARY OF THE INVENTION

An object of the present invention is to provide a piston formed so that outer members are fitted movably around a skirt portion of a piston body with an oil supplied to clearances between the outer members and skirt portion, characterized in that the part of the piston to which a load is imparted is not selected as a part to which an oil is supplied, oil grooves being formed selectively in the parts of the piston on which the breakage of an oil film is liable to occur, the oil grooves and a cooling cavity formed in the piston body communicating with each other, oil jets being introduced into the cooling cavity, whereby the oil is constantly supplied to the oil grooves so as to reliably lessen a shock occurring due to the oil breakage and reduce the slapping sounds.

This invention relates to a piston having a piston body comprising a piston ring groove-carrying crown portion, and a skirt portion provided with bosses in which pin bores for inserting a piston pin therein are formed; outer members fitted around the skirt portion; outer member support members interposed between the bosses and outer members and supporting the outer members so that the outer members can be moved relatively in the thrust direction; and oil grooves formed in the parts of the surface of the skirt portion which are on the thrust side and anti-thrust side, characterized in that the oil grooves are formed in the positions on the skirt portion which are higher than the axis of the piston pin and lower than the piston ring grooves.

In this piston, the oil grooves are provided in the parts of the skirt portion which are closer to the piston ring grooves than the cylinder liner colliding regions of the skirt shoulder part.

Since this piston is constructed in the above-described manner, an oil is supplied to the oil grooves even when the piston is inclined toward the anti-thrust side, and the oil is supplied to the clearances between the outer members and the skirt portion of the piston body, so that the breakage of an oil film does not occur. Accordingly, an outer member is pressed toward the cylinder liner and comes into close contact into the same. As a result, the collision of the piston with the cylinder liner is softened and the slapping sounds can be reduced reliably since a satisfactory oil film is formed securely around a cylinder liner colliding portion of the piston when the piston is moved toward the thrust side.

When the piston is moved reciprocatingly in a cylinder, the piston body is turned, i.e. moved pivotally around the axis of the piston pin. In accordance with the pivotal movement of the piston, the piston body is moved relatively to the outer members. The oil grooves in the thrust side part and anti-thrust side part of the surface of the skirt portion are positioned higher than the axis of the piston pin and lower than the piston ring grooves. Therefore, even when the piston is inclined toward the anti-thrust side, the oil is supplied constantly to the clearance on the thrust side, so that the breakage of an oil film does not occur. Consequently, when the piston body is thereafter inclined toward the thrust side and going to collide with an outer member, a satisfactory oil film is secured in the portion of this clearance which is around the colliding portion of the piston body, so that the oil in this clearance is forced out. Accordingly, the piston body receives a cushioning effect of the oil, whereby the occurrence of slapping sounds can be reduced reliably.

When the piston body is moved toward an outer member and going to collide with the same, the oil in the relative clearance is forced out from the peripheral portions of the outer member because the clearance is formed wider at the intermediate portion of the outer member and narrower at the peripheral portion thereof. Accordingly, as the piston body is moved toward the outer member, the clearance becomes narrower, and therefore, the peripheral portions of the outer member function as restrictions. Consequently, the piston body receives the resistance of the oil and becomes difficult to move closer to the outer member. When the piston body is thus moved pivotally around the axis of the piston pin, it receives the cushioning effect of the oil, and the occurrence of slapping sound is prevented effectively, whereby the slapping sound reducing performance of the piston can be maintained for a long period of time.

Since the clearances between the outer members and the skirt portion of this piston are formed wider at the intermediate portions of the outer members and narrower at the peripheral portions thereof, the oil is forced out gradually from the portions of a clearance which are at the peripheral portions of the relative outer member when thrust is exerted on the piston in accordance with the reciprocating movements of the piston. Therefore, the oil in the clearance can make a cushioning action as it receives the thrust. Accordingly, this piston does not cause during the reciprocating movements thereof a sudden increase in the hydraulic pressure in the clearance which gives rise to the rigidification of the oil. Therefore, even when the oil is used, the slapping sounds of the piston can be effectively reduced.

In this piston, the radius of an outer circumferential surface of each outer member is set equal to that of a cylinder bore, while the radius of the skirt portion is set larger than that of an inner circumferential surface of the outer member with the center of the radius of the skirt portion being offset from that of the piston body in the opposite direction.

According to the piston of the present invention, it becomes possible to lessen a shock of the slapping sound-generating collision of the piston by using an oil instead of a cushioning member of rubber or a synthetic resin, and a problem of permanent set in fatigue of the cushioning member does not arise and a long-life, low-noise piston can be offered.

The present invention relates to a piston having a piston body comprising a piston ring groove-carrying crown portion, and a skirt portion provided with bosses in which a pin bore for inserting a piston pin therein is formed; outer members fitted around the skirt portion; outer member support members interposed between the bosses and outer members and supporting the outer members so that the outer members can be moved relatively in the thrust direction; and oil grooves formed in the parts of the surface of the skirt portion which are on the thrust side and anti-thrust side, characterized in that the piston body is provided on the inner circumferential side of the piston ring grooves in the crown portion with an annular cooling cavity extending along the piston ring grooves.

The piston body is provided with first oil passages for introducing an oil ejected from oil jets into the cooling cavity. The piston body is further provided with second oil passages to allow the cooling cavity to communicate with the oil grooves. Therefore, the oil ejected from the oil jets is supplied to the cooling cavity through the first oil passages, and then the oil supplied to the cooling cavity to the oil grooves through the second oil passages, whereby the oil is constantly supplied to the clearances between the skirt portion and outer members.

Since this piston is constructed in the above-described manner, the oil supplied to the clearances between the skirt portion and outer members, i.e. the oil grooves can be furnished by utilizing the oil supplied to the cooling cavity provided for the purpose of cooling the piston, so that a low noise piston can be attained without changing the oil pump and connecting rod. In general, a structure for lubricating a larger end bearing for the connecting rod has to be designed with little allowance. In order to supply the oil to the clearances between the skirt portion and outer members, it becomes necessary to increase the capacity of the oil pump and the area of the bearing. However, according to the construction of this piston, the slapping sounds of the piston can be reduced by effectively utilizing the oil without deteriorating the bearing lubricating conditions.

Since oil is carried up to the top dead center with the oil retained in the clearances between the piston body and outer members, there is not the possibility that the oil is discharged from the clearances in the middle of the reciprocating movements of the piston, and the slapping sounds can be reduced reliably by utilizing a small quantity of oil supplied thereto. Namely, since the oil exists in the clearances between the piston body and outer members in this piston, an oil film pressure based on "restricting film action" occurs owing to the viscosity of the oil when the clearances are narrowed, and the slapping noise of the piston is thereby lessened.

BEST MODE FOR CARRYING OUT THE INVENTION

The embodiments of the piston according to the present invention will now be described with reference to the drawings. A first embodiment of the piston according to the present invention will now be described with reference to FIGS. 1, 2, 3 and 4.

Figure 1:
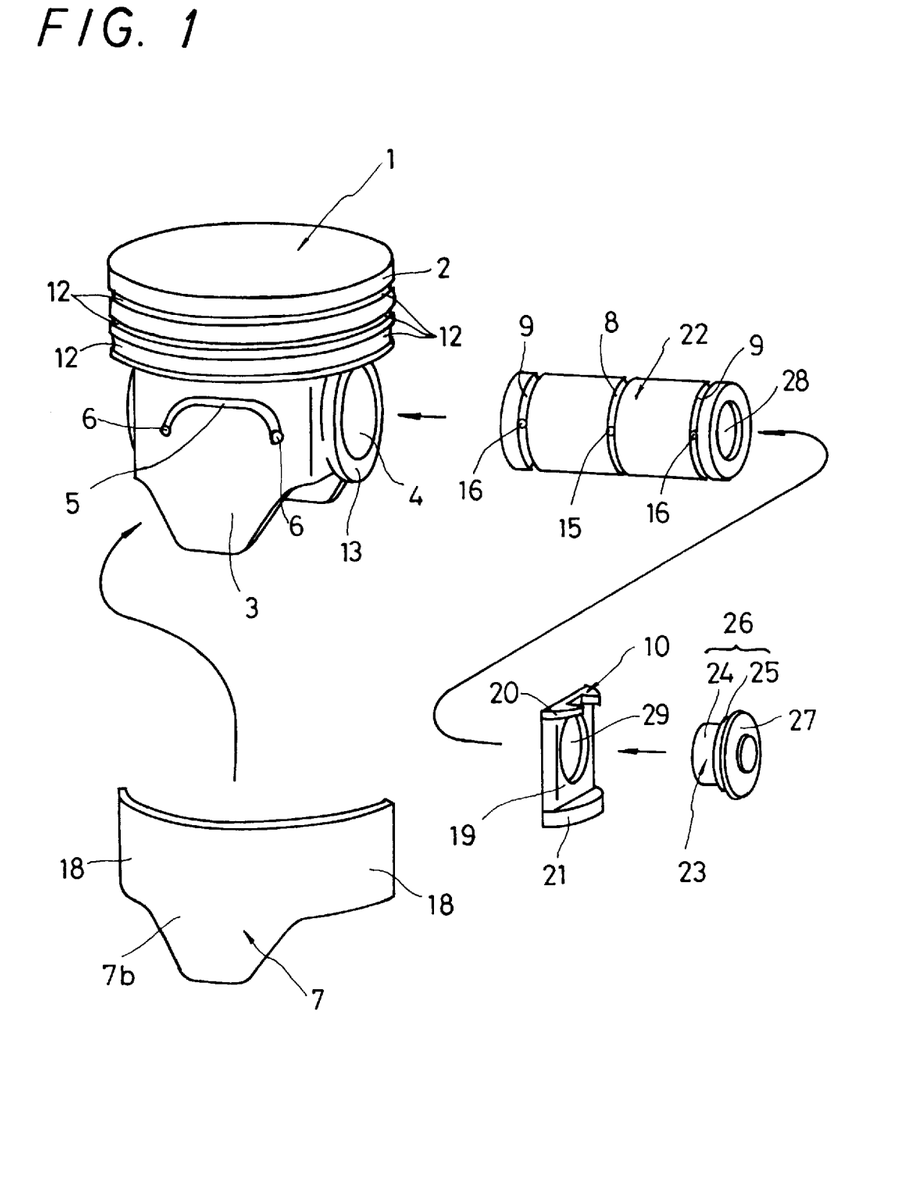
FIG. 1 is an exploded perspective view showing an embodiment of the piston according to the present invention.

As shown in FIG. 1, this piston has a piston body 1 comprising an integral structure of a crown portion 2, which constitutes a piston head portion, and a skirt portion 3 provided with bosses 13; outer members 7 fitted around the skirt portion 3; outer member support members 10 interposed between the bosses 13 and outer members 7 and supporting the outer members 7 so that the outer members 7 can be moved relatively in the thrust direction; a piston pin 22 rotatably connecting the piston body 1 and a connecting rod together; and subpiston pins 23 for fixing the outer members 10 to the piston pin 22.

Figure 3:
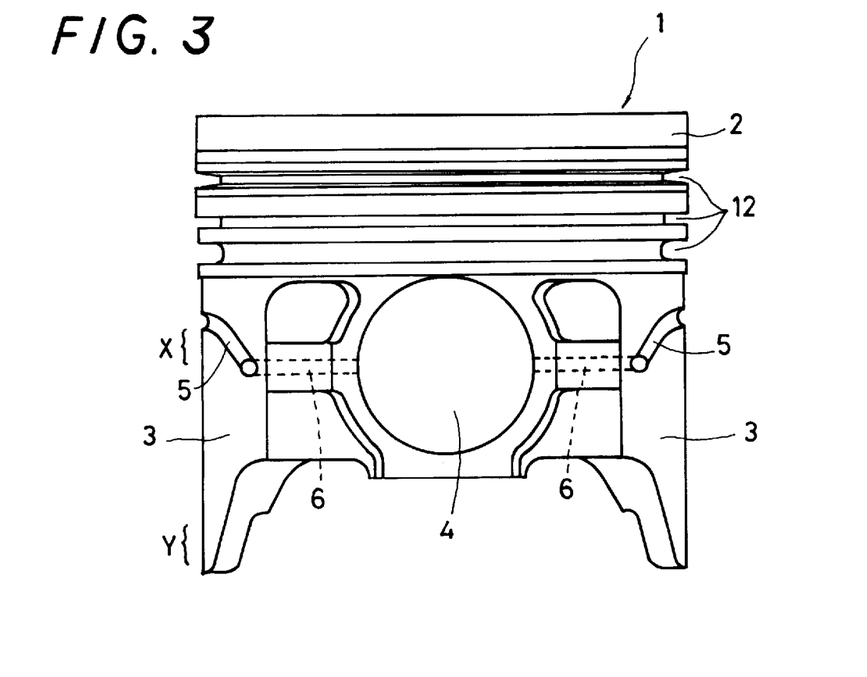
FIG. 3 is a front view showing the outer appearance of the piston of FIG. 1.

The crown portion 2 of the piston body 1 is provided with a plurality of piston ring grooves 12, in each of which a piston ring (not shown) is fitted. The skirt portion 3 has an outer diameter smaller than that of the crown portion 2, and is formed at a lower part of and integrally with the crown portion 2. The skirt portion 3 of the piston body 1 is provided with bosses 13 in which pin bores 4 through which the piston pin 22 is inserted are formed. As shown in FIG. 3, the piston body 1 is provided with oil passages 6 extending from the pin bores 4 toward the skirt portion 3. As shown in FIG. 1, the skirt portion 3 is provided with oil grooves 5 for distributing a hydraulic pressure, which is introduced from the oil passages 6 thereto, to the whole surface of the skirt portion 3.

The oil grooves 5 are formed in the thrust side part and anti-thrust side part of the skirt portion 3. The parts of the skirt portion in which these oil grooves 5 are formed are lower than the piston ring grooves 12 and higher than the axis of the piston pin 22. More concretely speaking, the parts of the skirt portion 3 from which a load is imparted to the outer members 7 are two parts (i.e. the parts shown by the letters X and Y), which are skirt shoulder parts and the parts in the vicinity of the skirt lower end as shown in FIG. 3. The outer member-colliding region X of the shoulder part is in general slightly higher than the centers of the pin bores 4 (i.e. the axis of the piston pin 22), though this depends upon the profile of the skirt portion 3. The oil grooves 5 are provided slightly closer to the piston ring grooves 12 than the outer member-colliding region X of the skirt shoulder part. Since the oil grooves 5 are formed so that they are away from the regions X, Y to which a load is imparted from the skirt portion 3 to an outer member 7, the load can be receive-d by a surface of an increased area, and an escape of a hydraulic pressure from the oil grooves 5 at the time of the reception of the load can be avoided. The shape of the oil grooves 5 is not limited to that shown in FIG. 1, as long as they are formed at a location meeting design purposes.

Since the oil grooves 5 are formed in positions higher than those of the outer member-colliding portions X of the skirt portion, the breakage of an oil film formed by the hydraulic pressure supplied from the oil grooves 5 does not occur even when the piston is inclined toward the anti-thrust side during a compression stroke. As a result, a hydraulic pressure cushioning effect is obtained owing to a hydraulic pressure supplied to the clearance between an outer member 7 and skirt portion 3 even when the piston is the reafter advanced to an explosion stroke, i.e. an expansion stroke and inclined toward the thrust side, so that the slapping sounds can be reduced (refer to FIGS. 11B and 11C).

The outer members 7 comprise a pair of cross-sectionally semicircular arcuate members 7b fitted around the skirt portion 3 of the piston body 1 and arranged symmetrically with respect to the piston pin 22. Each semicircular arcuate member 7b has arm portions 18 at both of circumferential side regions thereof, which arm portions 18 extend in the circumferential direction of the same member 7b. The outer members 7 are preferably formed out of a material having a thermal expansion coefficient substantially equal to that of the cylinder liner constituting the cylinder because a difference in the thermal expansion coefficient does not occur between the outer members 7 and cylinder liner. For example, when the cylinder liner is formed out of cast iron, the outer members 7 can be formed out of cast iron or steel, and, when the cylinder liner is formed out of a ceramic material, the outer members 7 can be formed out of a ceramic material.

The outer member support members 10 are arranged on the bosses 13 formed on the skirt portion 3 of the piston body 1 so as to hold the piston pin 22 from both sides thereof, and they are adapted to support the outer members 7. The outer member support members 10 are provided so that they can be turned around the axis of the piston pin 22. The outer member support members 10 have guide recesses 19 which restrict the vertical movement of the outer members 7 and allow the relative movement thereof in the thrust direction. These guide recesses 19 are defined by locking portions, i.e. flange portions 20, 21 formed in a projecting state on the upper and lower portions of the outer member support members 10. Since the width of the guide recesses 19 is set substantially equal to that of the arm portions 18 of the outer members 7, the arm portions 18 can be engaged with the guide recesses 19. When the arm portions 18 are engaged with the guide recesses 19, the outer members 7 are supported slidably by the guide recesses 19, which are formed in the outer member support members 10, via the arm portions 18. The guide recesses 19 are provided at their central portions thereof with pin bores 29 aligned with the pin bores 4 of the skirt portion 3.

Figure 4:
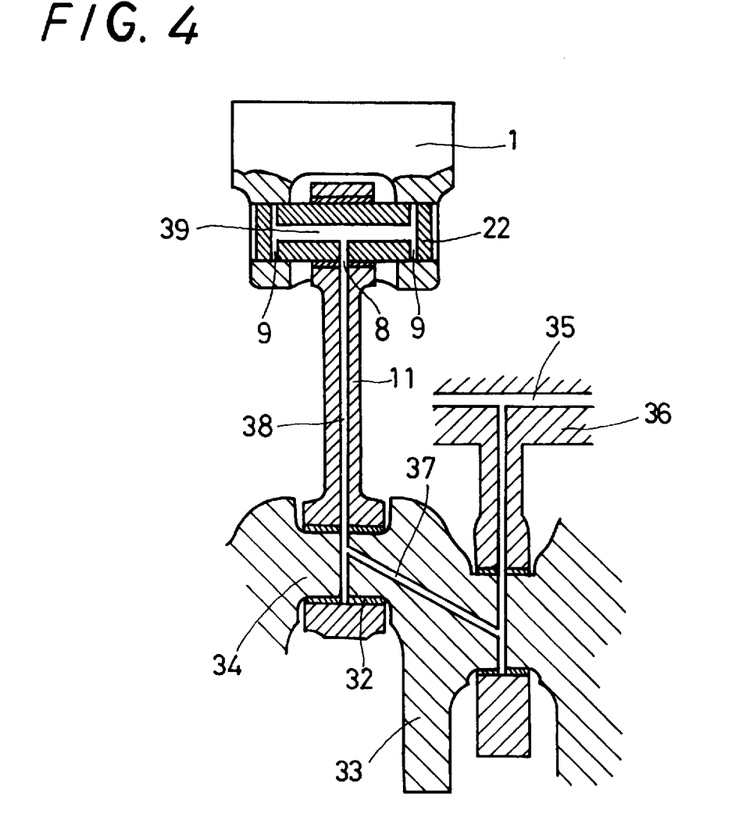
FIG. 4 is a schematic sectional view showing passages for supplying a hydraulic pressure to the piston of FIG. 1.

The piston pin 22 has a central bore 28, in which smaller diameter portions 24 of the subpiston pins 23 can be press fitted. The piston pin 22 further has circumferentially extending oil grooves 8, 9 in three portions, i.e. an intermediate and both end portions of an outer circumferential surface thereof, and these oil grooves 8, 9 communicate with the central bore 28 via oil passages 15, 16. As shown in FIG. 4, when the piston pin 22 is fixed to the piston body 1 and connecting rod 11, the oil groove 8 in the intermediate portion communicates with an oil passage in the connecting rod 11, and the oil grooves 9 in both end portions the oil passages 6 extending from the pin bores 4 of the piston body 1 toward the skirt portion 3.

As shown in FIG. 1, each subpiston pin 23 comprises a pin portion 26 formed by a smaller-diameter part 24 and a larger-diameter part 25, and a cap portion 27 formed at an end of the larger-diameter part 25. The smaller-diameter part 24 is press fitted in the central bore 28. The larger-diameter part 25 is fitted in the pin bore 29 of the relative outer member support member 10.

The assembling of this piston is done in the following manner. First, the piston pin 22 is inserted in the pin bores 4 of the piston body 1 and a bore of a smaller-diameter portion of the connecting rod 11, and fixed in the piston body 1. The outer member support members 10 are then applied to the bosses 13 of the piston body 1 so as to hold the piston pin 22 from both sides thereof, and the smaller-diameter portions 24 at one end part of the subpiston pins 23 are then press fitted in the central bore 28 of the piston pin 22. Consequently, the larger-diameter portions 25 of the subpistons 23 are inserted in the pin bores 29 of the outer member support members 10, and the outer member support members 10 in this condition are pivotable around the axis of the piston pin 22. The arm portions 18 are then inserted in the guide recesses 19 in the outer member support members 10 so as to hold the skirt portion 3 of the piston body 1 by the two outer member members 7 from both sides thereof, whereby the piston is assembled. Before this piston is set in a cylinder, the arm portions 18 of the outer members 7 easily come off from the guide recesses 19 in the outer member support members 10 but, when this piston is set in a cylinder, the outer members 7 do not come off from the outer member support members 10.

Figure 2:
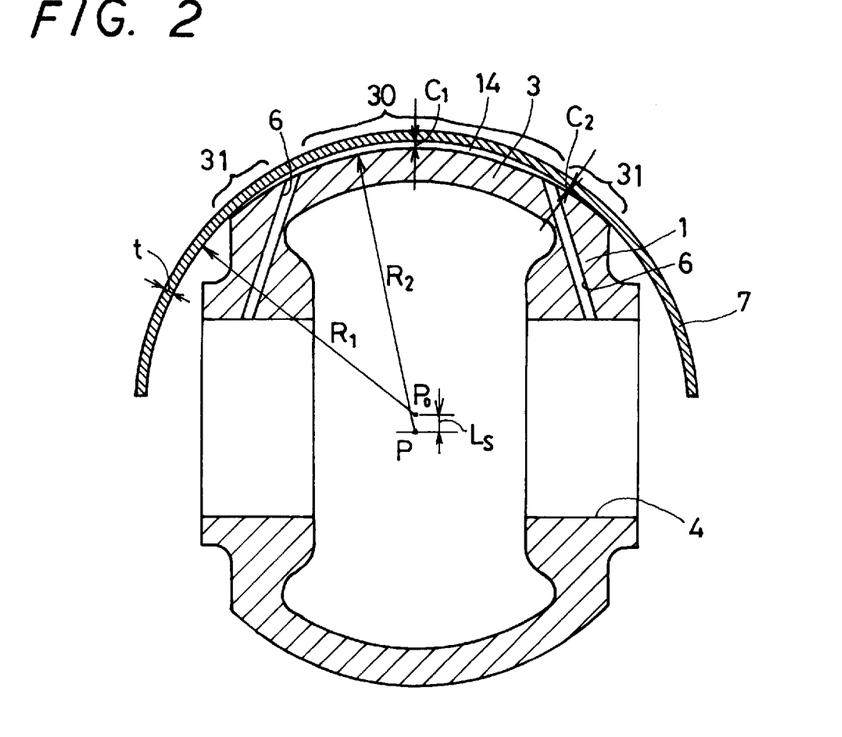
FIG. 2 is a sectional view on lines II—II of FIG. 3 showing the correlation between a piston body and outer members of the piston of FIG. 1.

The relation between the outer members 7 and the skirt portion 3 of the piston body 1 will now be described. As shown in FIG. 2, clearances 14 are formed between the outer members 7 and skirt portion 3. A hydraulic pressure is supplied to the clearances 14. The outer members 7 are formed so that the radius of the outer circumferential surfaces thereof is equal to that of the cylinder bore $B_r$. Accordingly, when the piston is installed in the cylinder, the outer members 7 closely contact the cylinder liner. The radius $R_1$ of the inner circumferential surfaces of the outer members 7 is expressed by $R_1=B_r-t$ wherein t represents the thickness of the outer members 7. In the piston body 1, the radius $R_2$ of the skirt portion 3 is set larger than that $R_1$ of the inner circumferential surfaces of the outer members 7 ($R_2>R_1$), and the center P of the radius $R_2$ of the skirt portion 3 is set away from the center $P_0$ of the piston body 1 in the opposite direction, i.e., offset in this manner by a very short distance Ls. When providing the clearances between the outer members 7 and skirt portion 3, the skirt portion 3 can be formed elliptically with respect to the center of the piston ($R_2>R_1$).

As a result, the width of the clearance 14 between each outer member 7 and skirt portion 3 at the central portion 30 of the outer member 7 is different from that at the peripheral portions 31 thereof. Let $C_1$, equal the width (of the clearance) at the intermediate portion 30, and $C_2$ the width (of the clearance) at the peripheral portions 31. The width $C_1$, at the central portion 30 becomes $C_1=R_1-(R_2-Ls)$. If $R_1$, $R_2$, Ls are selected suitably, the clearance can be formed so that $C_1>C_2$ is attained with the clearance between each outer member 7 and skirt portion 3 decreasing gradually from $C_1$ to $C_2$ starting at the central portion 30 toward the peripheral portions 31.

The passages for supplying a hydraulic pressure to the piston will now be described. As shown in FIG. 4, the piston body 1 is supported pivotably on a smaller-diameter end portion of the connecting rod 11 by inserting the piston pin 22 in the bore formed in the smaller-diameter end portion of the connecting rod 11 and the pin bores 4 of the skirt portion 3. A larger-diameter end portion of the connecting rod 11 is supported pivotably on a crank pin 34 of a crankshaft 33 via a connecting rod bearing 32. The crankshaft 33 is supported rotatably on a cylinder block 36 provided with an oil gallery 35.

In general, the piston is provided with an oil passage 37 extending from the oil gallery 35 to the crank pin 34 via the cylinder block 36 and crankshaft 33. In this embodiment, an oil passage 38 communicating with the oil passage 37 in the crank pin 34 is further formed in the connecting rod 11, and an oil port 8 communicating with the oil passage 38 in an intermediate portion of a circumferential wall of the piston pin 22. The oil port 8 formed in the intermediate portion of the circumferential wall of the piston pin 22 communicates with the central bore 28 as an oil passage 39, which communicates with oil ports 9 formed in both end portions of the circumferential wall of the piston pin. The oil ports 9 communicate with the oil passages 6 extending from the pin bores 4 of the piston body 1 toward the skirt portion 3. Since the piston is constructed in this manner, the pressure oil supplied from the oil gallery 35 is guided to the oil grooves 5 formed in the skirt portion 3 of the piston body 1 via these oil passages and oil ports, and supplied freely to the clearance 14 between an outer member 7 and skirt portion 3. This clearance 14 is not, of course, a closed space, so that the pressure oil flows out freely from the clearance 14. In this condition, the outer member 7 is pressed against the wall surface of the cylinder liner at a predetermined pressure, and closely contacts at its outer circumferential surface the wall surface of the cylinder liner. The predetermined pressure referred to above means a low pressure which allows the outer member 7 to be kept in light contact with the wall surface of the cylinder liner at all times.

The piston according to the present invention has the above-described construction, and is operated as follows. When the piston is moved reciprocatingly, the outer members 7 are moved reciprocatingly and unitarily with the piston body 1. In accordance with the reciprocating movement of the piston, the piston body 1 is moved in the thrust directing direction, i.e., moved pivotally around the piston pin 22, and the skirt portion 3 is going to collide with the inner surface of the cylinder liner via an outer member 7. During this time, the piston body 1 is moved toward the outer member 7, and, therefore, the pressure oil with which the clearance between the outer member 7 and skirt portion 3 is filled is forced out from the clearance portions $C_2$ at the peripheral parts 31 of the skirt portion 3. However, since the clearance 14 is formed wider at the intermediate portion 30 (clearance portion $C_1$) of the outer member 7, and narrower at the peripheral portions 31 thereof (clearance portions $C_2$) ($C_1>C_2$), the clearance 14 becomes narrower as the piston body 1 moves closer to the outer member 7, and the peripheral portions 31 display their function as restrictions, the piston body 1 suddenly receiving the resistance of the hydraulic pressure and becoming difficult to approach the outer member 7. Since the piston body 1 receives a hydraulic pressure cushioning effect when it is moved pivotally around the axis of the piston pin 22, the occurrence of slapping sounds can be prevented, and the slapping sound reducing performance can be maintained for a long period of time.

In this piston, especially, the positions of the oil grooves 5 formed in the parts of the surface of the skirt portion 3 which are on the thrust directing side and anti-thrust side are set higher than the axis of the piston pin 22 and lower than the piston ring grooves 12. Therefore, even when the piston is inclined toward the anti-thrust side, the breakage of an oil film due to the hydraulic pressure supplied from the relative oil groove 5 does not occur. As a result, when the piston is moved to the thrust side, a satisfactory oil film is formed securely around the colliding portions, the collision of the skirt portion is eased, and the slapping sounds can be reliably reduced.

Figure 5:
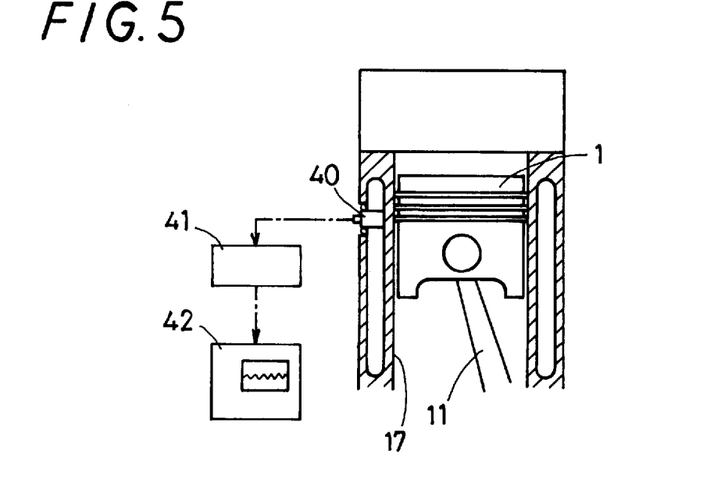
FIG. 5 is a schematic diagram showing an apparatus for measuring the vibration of a cylinder liner surface.
Figure 6:
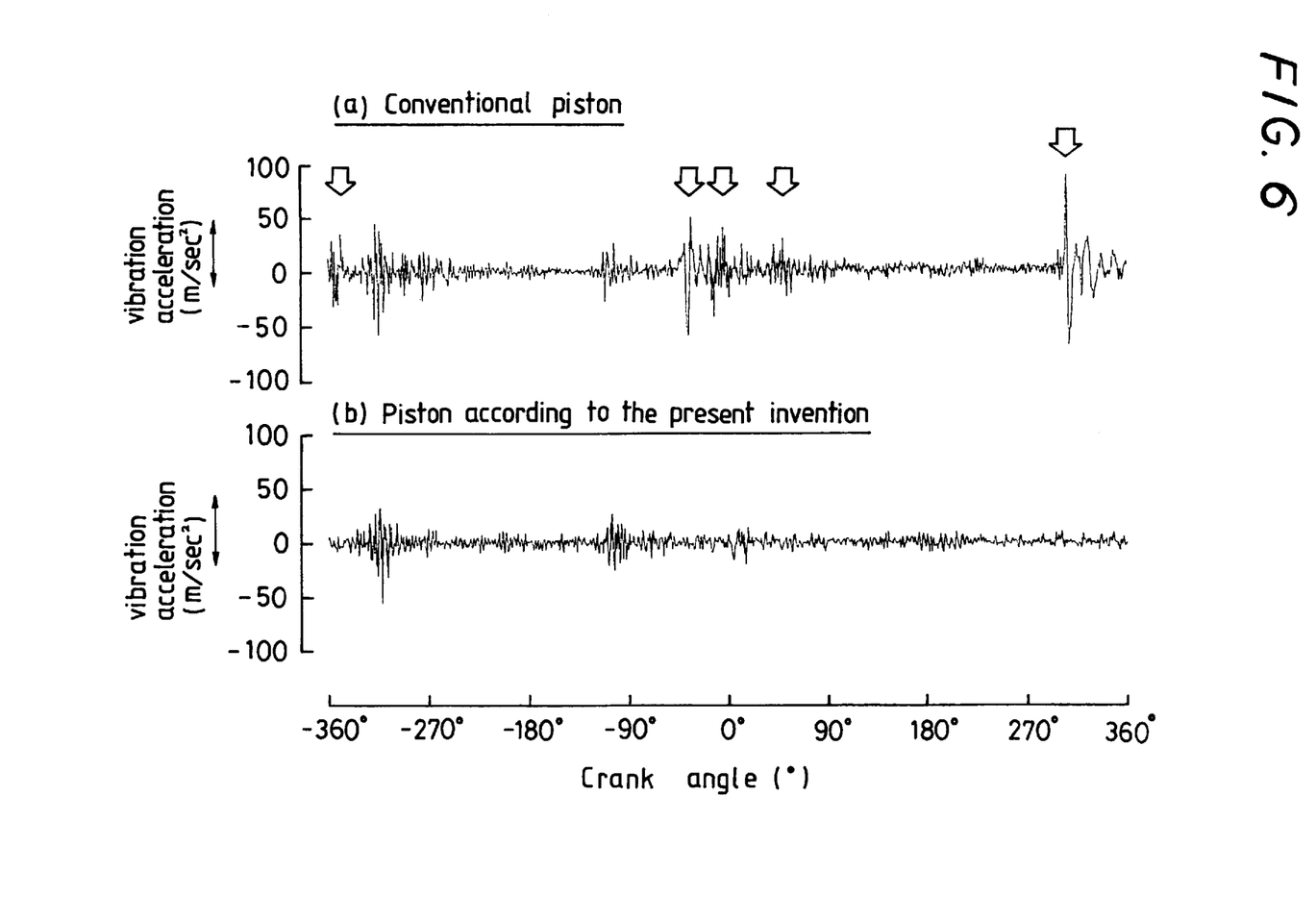
FIG. 6 is a graph showing the results of the actual measurement of the vibration of the cylinder liner wall surface.

In order to ascertain the effect of the piston concerning this matter, the vibration of the cylinder liner wall surface 17 was measured by using an apparatus shown in FIG. 5. Acceleration sensor 40 is fixed to the cylinder, and the vibration of the cylinder liner wall surface 17 during an operation of the piston was measured with an oscilloscope 42 via a charge amplifier 41. The results are shown in FIG. 6. Referring to FIG. 6, a graph (a) is a record of vibration acceleration of the surface 17 in a case where a conventional mass-production piston (general piston not provided with the outer members 7) was installed in the cylinder, and a graph (b) a record of vibration acceleration of the surface 17 in a case where the piston according to the present invention was installed in the cylinder. The conditions for the measurement included 2400 rpm motoring. As is clear from a comparison between (a) and (b) above, it is understood that the graph (b) shows a great decrease of vibration at the portions indicated by arrows, and that the slapping sounds decrease owing to the hydraulic pressure cushioning effect. The remaining portions of the vibration in the graph of (b) in FIG. 6 appear to be vibration caused by a valve gear system and a combustion chamber.

Another embodiment of the piston according to the present invention will now be described with reference to FIGS. 12, 13, 14 and 15.

Since this embodiment has the same construction and function as the previously-described embodiment except that it has a cooling cavity from which oil can be supplied to a piston body, and structures for communicating the cooling cavity with the oil grooves 5, the same parts are designated by the same reference numerals, and the duplication of description thereof is omitted.

This piston comprises a piston body 1 formed by a crown portion 2 provided with piston pin grooves 12, and a skirt portion 3 provided with bosses 13 having pin bores in which a piston pin is inserted. This piston has just as the piston of the previously-described embodiment outer members (not shown) (designated by a reference numeral 7 in FIG. 1) fitted around the skirt portion 3, outer member support members (not shown)(designated by a reference numeral 10 in FIG. 1) interposed between the bosses 13 and outer members and supporting the outer members so that the outer members can be moved relatively in the thrust direction, and oil grooves 5 formed in the portions of the surface of the skirt portion 3 which are on the thrust side and anti-thrust side. The piston body 1 is provided in the region thereof which is on the inner side of the piston ring grooves 12 in the crown portion 2, and which extends along these piston ring grooves, with an annular passage, i.e. a cooling cavity 45 communicating with the oil grooves 5 and receiving an oil supply.

Figure 12:
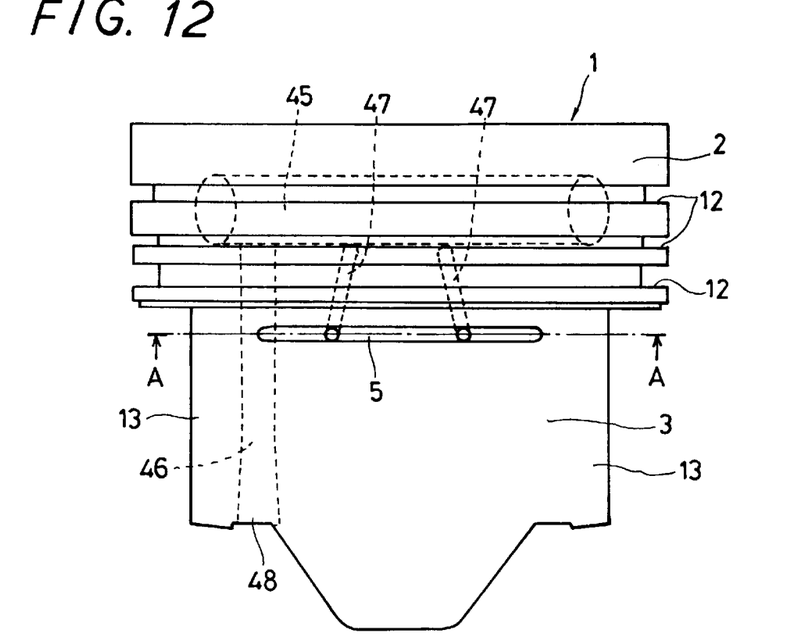
FIG. 12 is a side view of a piston body in another embodiment of the piston according to the present invention.
Figure 13:
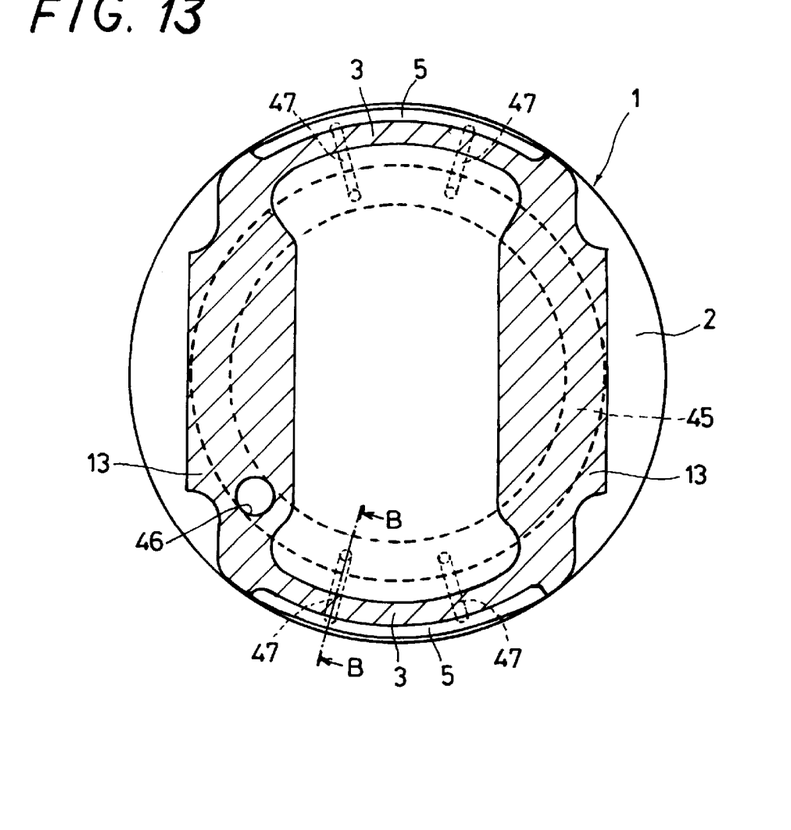
FIG. 13 is a sectional view taken along the line A—A in FIG. 12.
Figure 14:
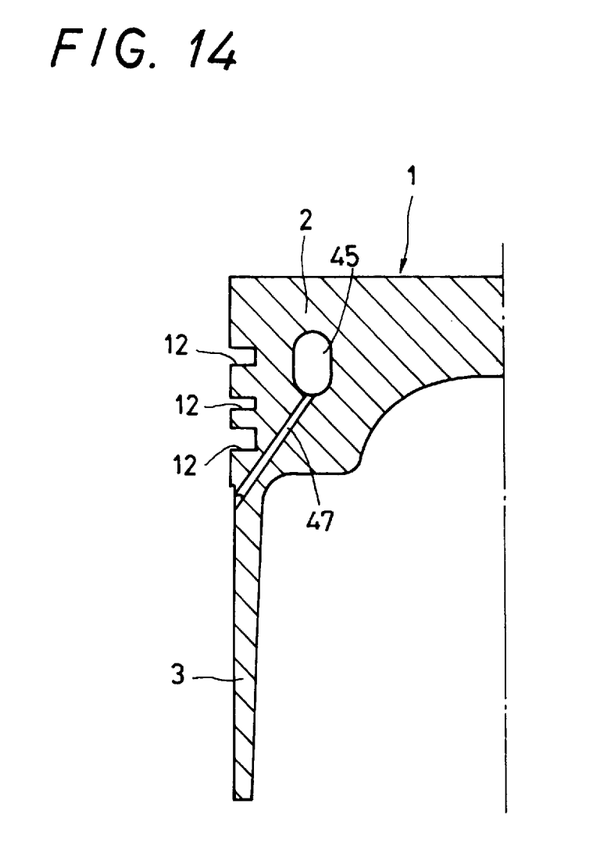
FIG. 14 is a sectional view taken along the line B—B in FIG. 13.

In the piston body 1, an oil passage 46 constituting a first oil passage communicating an opened portion 48 at an lower end of the skirt portion 3 with the cooling cavity 45 is formed so as to guide the oil ejected from an oil jet (not shown) to the interior of the cooling cavity 45. In order to introduce a pressurized oil from an oil gallery provided in a cylinder block into the cooling cavity 45 when the piston is in a position in the vicinity of the bottom dead center thereof, an oil jet nozzle communicating with the oil gallery is formed so as to be inserted into the opened portion 48 when the piston is in the mentioned position. Accordingly, the pressurized oil from the oil gallery is supplied reliably to the cooling cavity 45 through the oil passage 46.

The piston body 1 is further provided with oil passages 47, which extend from the cooling cavity 45 in the downward direction and constitute second oil passages, so that the cooling cavity 45 and the oil grooves 5 formed in the skirt portion 3 communicate with each other thereby, for the purpose of supplying the oil in the cooling cavity 45 to the oil grooves 5. Since the oil in the cooling cavity 45 is not pressurized, the supplying of the oil to the oil grooves 5 communicating with the oil passages 47 is not done forcibly.

The oil in the cooling cavity 45 receives upward and downward inertial force alternately due to the upward and downward movements of the piston. When the piston is moved up, the oil receives a downward inertial force, and the oil in the cooling cavity 45 is supplied to the oil grooves 5 through the oil passages 47. In this piston, the oil in the cooling cavity 45 is sucked out through the oil passages 47 by a respiratory effect occurring when the clearance (designated by a reference numeral 14 in FIG. 2) between the skirt portion 3 and an outer member is widened due to the lateral movement of the piston, whereby the oil is supplied to the oil grooves 5 in some cases. Accordingly, in this piston, the oil in the cooling cavity 45 can be supplied reliably to the clearances between the skirt portion 3 and outer members, i.e. the oil grooves 5 through the oil passages 47.

This piston is constructed as described above, in which an oil is supplied to the cooling cavity 45 by an oil jet, with which oil the piston is cooled. Especially, the oil supplied to the cooling cavity 45 can be supplied reliably and smoothly to the clearances between the skirt portion 3 and outer members, i.e. the oil grooves 5 through the oil passages 47. The oil once supplied to the oil grooves 5 form oil films between the skirt portion 3 and outer members, and the skirt portion 3 and outer members are moved vertically together, so that the oil is held in the oil grooves 5 unless it is discharged therefrom forcibly. Therefore, when the piston is going to collide with the thrust side of the cylinder liner in a position in its top dead center, the slapping sound is lessened by the oil held in the clearances and oil grooves 5, and thus, the slapping noise of the piston can be reduced. Accordingly, a low-noise piston can be attained by merely forming the cooling cavity 45 and oil passages 46, 47 without changing an oil pump and a connecting rod.

Figure 15:
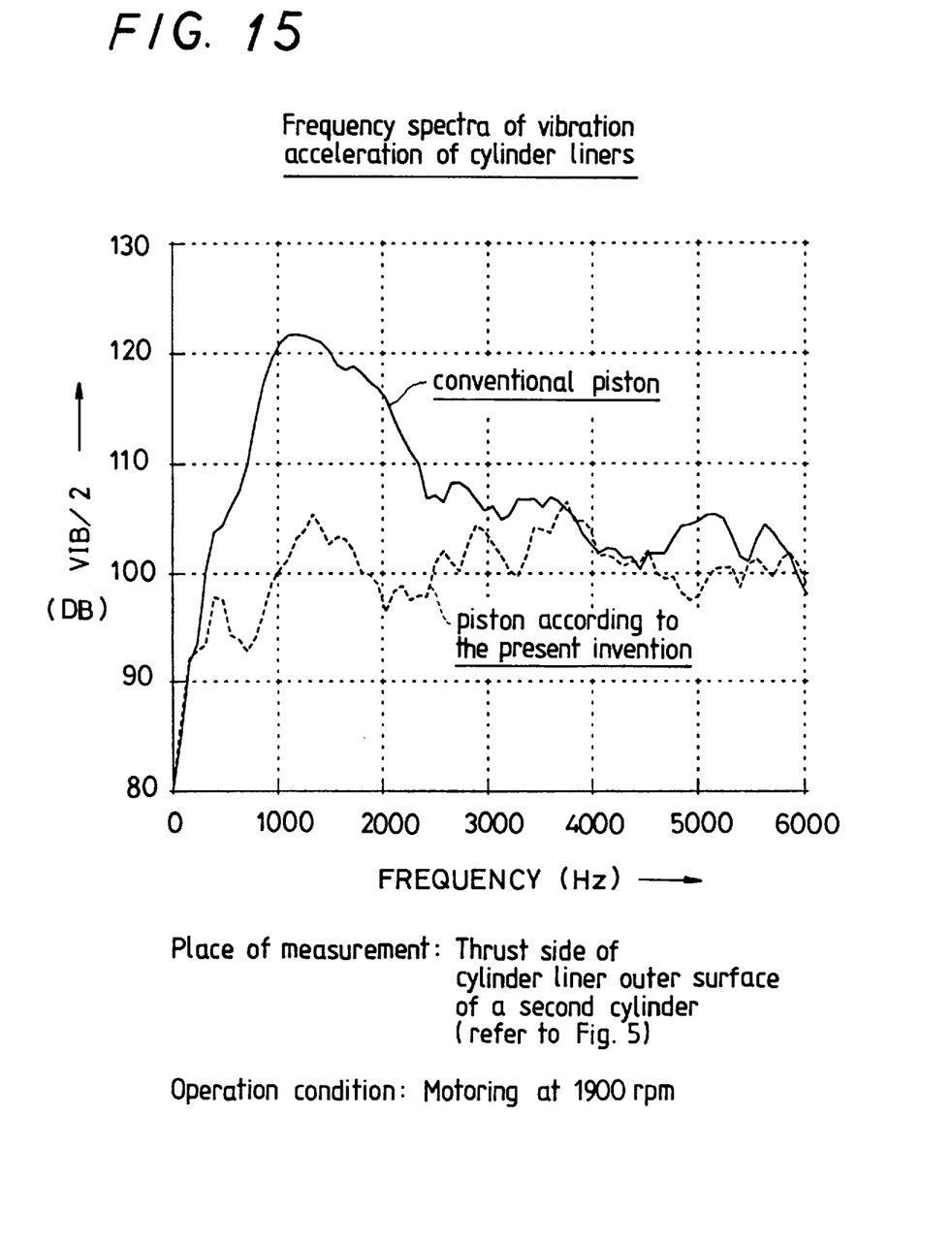
FIG. 15 is a graph showing the frequency spectra of the vibration acceleration of cylinder liners.

Regarding this piston, a frequency spectrum of vibration acceleration of a cylinder liner was measured to obtain the results shown in FIG. 15. A piston not provided with oil grooves and oil passages which communicate with the oil grooves was used as a conventional piston. The conditions for the measurement included a place of measurement, which was set to a thrust side portion of an outer surface of a cylinder liner of a second cylinder, in which a sensor 40 was provided as shown in FIG. 5, and operation condition of 1900 rpm motoring. It is understood from the graph of FIG. 15, which shows the relation between the frequency (Hz) and vibration acceleration (DB), that, when the frequency is low, the piston according to the present invention enables the slapping noise to be reduced.

INDUSTRIAL APPLICABILITY

Since the piston according to the present invention is constructed as described above, the oil is supplied from the oil grooves to the clearances between the outer members and skirt portion of the piston body even when the piston is inclined toward the anti-thrust side, so that the breakage of oil film does not occur in the clearances between the outer members and the skirt portion of the piston body. Consequently, a satisfactory oil film is formed securely around a colliding portion of the piston body when the piston is moved toward the thrust side. This enables the collision of the piston to be eased, and the slapping sounds of the piston to be reduced reliably. Therefore, this piston is useful as a piston for an internal combustion engine.

I claim:

1. A piston comprising a piston body formed by a crown portion provided with piston ring grooves, and a skirt portion provided with bosses in which pin bores for inserting a piston pin therein are formed; outer members fitted around said skirt portion; outer member support members interposed between said bosses and said outer members and supporting said outer members so that said outer members can be moved relatively in the thrust direction; and oil grooves formed in the parts of the surface of said skirt portion which are on the thrust side and anti-thrust side, said oil grooves being formed in the positions on said skirt portion which are higher than the axis of said piston pin and lower than said piston ring grooves.

2. A piston comprising a piston body formed by a crown portion provided with piston ring grooves, and a skirt portion provided with bosses in which pin bores for inserting a piston pin therein are formed; outer members fitted around said skirt portion; outer member support members interposed between said bosses and said outer members and supporting said outer members so that said outer members can be moved relatively in the thrust direction; and oil grooves formed in the parts of the surface of said skirt portion which are on the thrust side and anti-thrust side, said piston body being provided in the region thereof which is in the inner circumferential side of said piston ring grooves in said crown portion and extends along said piston ring grooves with annular cooling cavity communicating with said oil grooves and adapted to receive the supply of an oil.

3. A piston according to claim 2, wherein said oil grooves are formed in the positions on said skirt portion which are higher than the axis of said piston pin and lower than said piston ring grooves.

4. A piston according to claim 1, wherein clearances between said outer members and said skirt portion are formed so that the clearances are wider at the intermediate portions of said outer members and narrower at the peripheral portions thereof.

5. A piston according to claim 1, wherein said outer members are formed so that the radius of the outer circumferential surfaces thereof is equal to that of a cylinder bore, said skirt portion being formed so that the radius thereof is larger than that of the inner circumferential surfaces of said outer members with the center of the radius of said skirt portion being offset from the center of said piston body in the opposite direction.

6. A piston according to claim 2, wherein said piston body is provided therein with first oil passages for introducing the oil ejected from oil jets into the interior of said cooling cavity.

7. A piston according to claim 2, wherein said piston body is provided therein with second oil passages for allowing communication between said cooling cavity and said oil grooves.

8. A piston according to claim 2, wherein clearances between said outer members and said skirt portion are formed so that the clearances are wider at the intermediate portions of said outer members and narrower at the peripheral portions thereof.

9. A piston according to claim 2, wherein said outer members are formed so that the radius of the outer circumferential surfaces thereof is equal to that of a cylinder bore, and said skirt portion being formed so that the radius thereof is larger than that of the inner circumferential surfaces of said outer members with the center of the radius of said skirt portion being offset from the center of said piston body in the opposite direction.

10. A piston according to claim 1, wherein the outer members cover the oil grooves.

* * * * *